April 29, 1958   G. ALLIMANN   2,832,253
EXPANSION BOLT HAVING EXPANDING JAWS SECURED
TO ELASTIC CUP-SHAPED MEMBER
Filed March 1, 1952   2 Sheets-Sheet 1

INVENTOR:
GEORGES ALLIMANN

BY

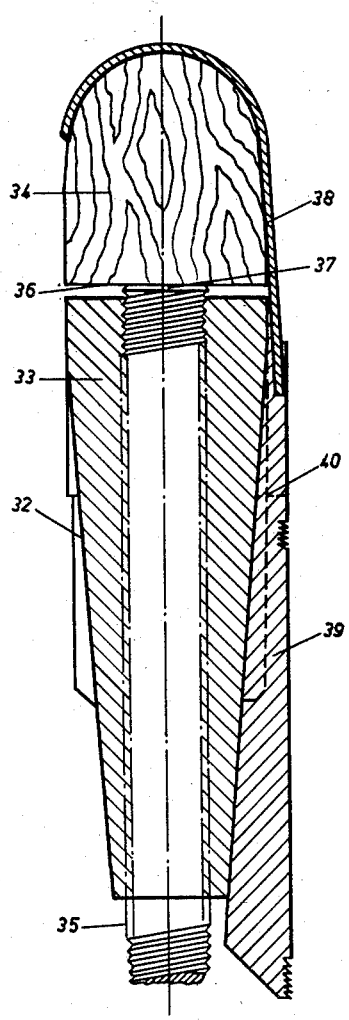
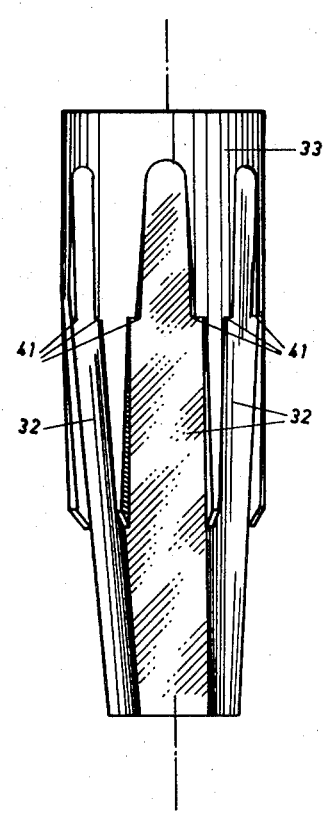

United States Patent Office 2,832,253
Patented Apr. 29, 1958

2,832,253

EXPANSION BOLT HAVING EXPANDING JAWS SECURED TO ELASTIC CUP-SHAPED MEMBER

Georges Allimann, Mulhouse, France

Application March 1, 1952, Serial No. 274,459

3 Claims. (Cl. 85—2.4)

This invention relates to anchoring rods for securing roof or wall supporting plates in mining, tunnelling, quarrying and the like, or for anchoring purposes in general.

With the comparatively large and open galleries which now have become necessary owing to the mechanisation of working, it is essential to keep the galleries free of props, and the roof is, therefore, supported by supports provided by anchoring rods equipped with supporting plates, these anchoring rods being each arranged in a perpendicular or inclined bore which extends a relatively great distance into the roof, that is to say, in principle, as far as a solid stratum.

The anchoring of these rods has, hitherto, usually been effected in the manner of wall dowels. For this purpose, the anchoring rod has consisted of a screw bolt having an upwardly divergent taper at its upper end and an expandible element co-operating with the tapered end. This element is usually expandible in such a manner that its upper parts were driven outwardly cup-fashion, while the width of the lower parts remains practically unchanged. The anchoring rods are knocked, head first, into a corresponding bore in the wall whereupon the expandible element is opened up and brought into position in the bore by hammering, screw action or by means of an auxiliary tool. In some constructions, a wedge taper is caused, by subsequent lowering of the bolt, to act to a greater or lesser extent on the expandible element so that the latter can be anchored better in the bore by enlargement of the upper portion. A supporting plate, is suitably bored singly or severally, is then pushed over a plurality of stem ends of the anchored bolts and is clamped against the roof to be supported by tightening a nut on each end of the stems. During this operation, the lower end of the anchoring rod often projects far beyond the nut when the latter is tightened up—due to an unallowably long sliding movement of the head of the anchoring rod in the bore or to an incorrect depth of the bore—and then, especially in low galleries, has to be sawn or sheared off or bent over.

The present invention is based on the knowledge that it is desirable for a rapid, certain and rigid anchoring of the anchoring rod that the expandible element in any position reacts immediately and automatically against any reverse movement of the anchoring rod, in that it is initially automatically jammed against the wall of the bore, is thereby stopped and finally compels the taper to become effective in order that, corresponding to the increase in the axial tension on the rod, the peripheral parts of the element are always supported, expanded and forced with greater strength against the walls of the bore. Any appreciable sliding of the expandible element in the bore hole is thus already excluded with the initiation of the screw or wedge action and thus prevents the undesirable projection of the ends of the anchoring rod into the gallery.

In contrast to the known constructions, the expandible part or parts of the element are for this purpose so fashioned that they are open downwardly and that the side thereof, which faces the wall of the bore and which may be barbed, is always disposed at a forwardly divergent acute angle with respect to the wall and is always brought to bear, at least with its lower edge—if not with several of the projecting barbs at the same time—in a barb-like resilient manner on the wall of the bore, whereby a forward sliding frictional movement in the bore hole is possible, while backward movement is completely impossible because of the engagement of the barbs or the sharp edges acting as barbs.

Accordingly, the present invention is characterised by the fact that the expandible element comprises at least one clamping jaw which co-operates with an associated wedge-like surface on the head of the anchoring rod and is arranged so as to be displaceable in the axial plane and to rock in the radial direction on a holder capable of being supported, or integral with the head, the arrangement being such that on introducing the anchoring rod into a bore hole, the expanding element, introduced with the head slides its clamping jaw along the wall of the bore hole in the released position with more or less strong pressure, subsequent rearward movement of the anchoring rod resulting in an immediate opening of the clamping jaw (similar to the opening of an umbrella or parachute), followed by a radial pressure on the wall of the bore due to the relative backward movement of the wedge of the anchoring rod, such pressure corresponding to the extent of the wedge action.

In the accompanying drawings, which illustrate several embodiments of the invention, Figure 1 diagrammatically illustrates a complete arrangement in cross-section through a gallery; A, B, C and D each illustrate a particular means for tightening the ends of the anchoring rods. The first (A) consists of a worm thread; the second (B) consists of a screw head solid with the anchoring rod, the tightening thread being disposed at the upper end of the anchoring rod and the separate head of the anchoring rod being formed as a threaded nut; the third (C) is a similar arrangement but having a checker portion for the purpose of strengthening the anchoring rod, which is kept thin to save weight; the fourth (D) comprises a cutter.

Figure 6 is a vertical longitudinal section of a further embodiment of the invention.

Figure 7 is an elevation of the rod head section formed with wedge surfaces for guiding the clamping jaws, corresponding to Figure 6.

Figure 1:
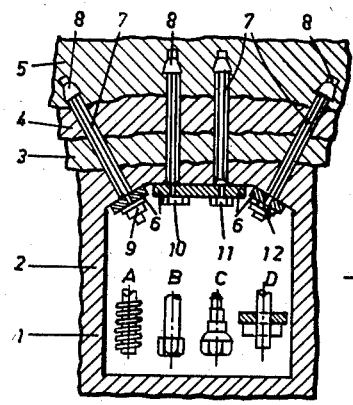

Referring first to Figure 1, a seam 1 of coal has a gallery 2 cut in it, the roof of the gallery consisting of a number of different strata, of which only the lowermost strata 3, 4 and 5 are shown, the high overburden located above these strata being omitted.

Supporting plates 6 are located beneath the roof and are connected by a number of anchoring rods 7 passing through the intermediate strata to the uppermost stratum 5, in a number of perpendicular and inclined bores driven through the roof as far as the anchoring position in the stratum 5. Each rod 7 has an expandible element 8 anchored with respect to the wall of the bore at the inner end of each bore. The bottom or outer end of each rod either has a nut 9 screwed thereon, or has a screw head 10 or 11 formed thereon, or has a cotter 12 fitted thereon. The roof-supporting plate 6 can be clamped directly against the roof by means of the nut 9 or the cotter 12, or it can be clamped against the roof by means of a screw-thread at the upper end of the rod, heads 10 or 11 forming threaded nuts. Thus, any danger of the stratum located beneath the anchoring caving-in is prevented.

The upper end of each anchoring rod 7 is shaped in the form of a head which can be either integral with or constructed as a separate part.

Figure 2:
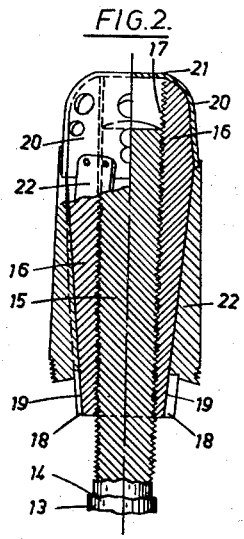
Figure 2 shows a head of an anchoring rod and of an expanding element partly in vertical longitudinal section and partly in side elevation.
Figure 3:
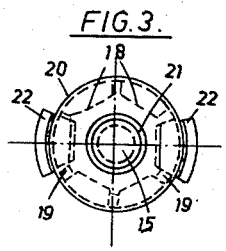
Figure 3 is a plan view of the Figure 2 construction.

In the embodiment illustrated in Figures 2 and 3, a rod proper 13 is reduced at its upper end to provide a threaded pin 13 and to form a shoulder 14. The head 16 of the anchoring rod is constructed as a separate part having a through bore and a screw-thread 17 which is formed on the upper end 49 of the anchoring rod. The anchoring rod is provided at its bottom end with a head, and when the rod is tightened, the upper end 15 of the rod is tightened in the head and may even project through the head 16 for the purpose of receiving a second anchoring rod head, if this is necessary, for example, with very soft rock. An angular projection on the anchoring rod is provided at the base of the thread for stopping the clamping jaws in their lowermost position. The head 16 is also provided with grooves 18 and long or short intermediate ribs 19 but it is rounded at the top for receiving the holder.

The holder consists of a rubber hood 20 which has a central round opening 21 and is fitted over the rounded portion of the head; the hood can, if desired, be apertured laterally to increase its elasticity. The clamping jaws 22 are secured to, and suspended from, the bottom edge of the hood 20 and are urged upwardly on the wedge surfaces by the peripheral tension of the rubber. The central aperture serves not only for any possible movement of the anchoring rod in an upward direction, but is also intended to expand the arched portion of the rubber hood by providing suitable tension and thereby to permit an axial displacement in a downward direction of the upper rubber edge and, therefore, of the hood, on the upper portion of the anchoring head for the purpose of displacement of the height position of the suspended clamping jaws; this renders it possible to use one anchoring head for bores which differ widely in diameter and may be made even more effective by having a head with a tapered and elongated upper part provided with circular grooves or steps.

Figure 4:
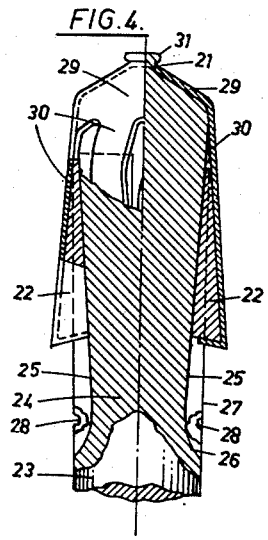
Figure 4 is another embodiment, partly in vertical section and partly in side elevation.
Figure 5:
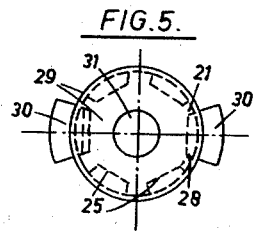
Figure 5 is a plan view of the Figure 4 construction.

In the embodiment illustrated in Figures 4 and 5, the anchoring-rod stem 23 made cylindrical at the upper end over the entire part of the head 24 is also provided with grooves 25 and intermediate ribs 27, a notch 28 serving to arrest the clamping jaw 22 in its lowermost position. Each of the grooves is limited at the stem end by a rounded portion 26.

The clamping jaws 22 are again suspended from a support which consists of a rubber hood 29 which is disposed on the rounded upper part of the rod head 24 and which is provided with strip-like extensions 30, each extending into one of the grooves. Fixed to these extensions are the clamping jaws 22, each extension extending downwardly on the outside of the corresponding clamping jaw 22 and being bent around the bottom end thereof. The clamping jaws 22 are accordingly provided on the outside with a rubber covering, whereby the frictional engagement thereof with the wall of the bore hole is assisted, more especially when the bore holes have smooth walls.

It is not essential that the strip-like extensions 30 should be guided around the bottom edges of the clamping jaws; the desired object is also achieved if the extensions 30 stretch only as far as the region of the bottom edges of the clamping jaws.

The rubber hood 29 again has a central opening 21, through which is passed a centering projection 31 on the top end of the rod head 24.

The automatic spring pressure action of the clamping jaws on the wall of the bore before the initiation of the wedge action, such as sought in each of the constructional examples described, can be achieved or strengthened in other ways, for example, by suitably arranged rubber cushions on the clamping jaws or on the anchoring head.

It is obvious that the blade-like extensions of the wedge pieces may also have a cross-section other than flat, and may be made integral with the wedge member, for example, by rolling or forging. Similarly, the fastening between the wedge member and the blade can be effected by methods other than those described.

It is, generally speaking, desirable that the clamping jaws be angular on the outside in order reliably to prevent any turning of the expandible element in the bore during the anchoring operation, as the expandible element must, during this anchoring operation effected by screwing, be able to take up a torque transmitted from the bolt head to the clamping jaws, for which the simple and, at the commencement, possibly insufficient friction between the clamping jaws and the wall of the bore is inadequate. However, if the clamping jaws are formed with edges on the outside, the edges bite more easily into the wall of the bore and a ridge, which may be only quite small, is thereby formed between adjacent clamping jaws; this ridge prevents turning movement of the expandible element.

The anchoring rods, already briefly mentioned, the upper ends of which are screwed in the manner of a screw nut into a separate anchoring head provided with an internal thread, are kept thin, i. e. light, mainly for the purpose of saving material and facilitating transport, but they are nevertheless made from material with a high shearing strength in order to achieve the desired tensile strength.

The anchoring operations will, of course, normally be effected by persons, such as miners, who are accustomed to heavy work. Consequently, in order to prevent any unduly strong tightening action during or after the screwing of the anchoring rod into the anchoring head, and to counteract any undesirable excessive pre-loading of the anchoring rod with tension before the initiation of the actual supporting action of the rod, the threaded end of the latter, as already mentioned, may be provided with a special and preferably steep thread. In addition, as illustrated at C (Figure 1), the bottom of the anchoring rod, which is forged to form a hexagonal screw head, can be thickened over a part of its length by upsetting so that this part is considerably strengthened; thus, if the head should not bear on the anchoring plate at right angles, the strengthening can take up and compensate for any supplementary stresses in the part. The spherical form of the rear part of the screw head is to facilitate, in any position, the most favourable bearing of the head on the anchoring plate which, for this purpose, has a semicircular recess around the hole.

In view of the fact that in some cases a partial crushing of the clamping jaws, and thus a very strongly braked sliding of the anchoring head in the bore hole with consequent too strong a pull on the anchoring rod, is to be preferred to a shearing of the rod, it is possible for the clamping jaws themselves to be made of a material, perhaps a non-metallic material, which is of exactly suitable hardness.

If in some cases an anchoring completely filling the bore hole is desired, the free space around the anchoring rod can be filled by sheaths, wedges, cement mortar and the like.

In the form illustrated in Figures 6 and 7, the rod head is divided transversely into a lower head section 33 comprising a wedge surface 32 for the clamping jaw guide means and an upper head section 34 comprising the support for the expandible element. The lower head section 33 is formed with a central, threaded through bore into which is screwed the stem of a rod provided with a suitable external thread 35. The upper head section has at the bottom end a supporting surface 36 which co-acts with the end 37 of the rod stem. The head section 34 is cylindrical and has a spherical upper end which is constructed as a support for the holder of the expandible element. This holder is a rubber hood 38, from which clamping jaws 39 are suspended in a manner similar to that in the construction of Figures 2 and 3. For the purpose of showing the arrangement more clearly, Figure 6 shows only a single clamping jaw located at the right-hand side. Each clamping jaw is provided with laterally, i. e. peripherally, projecting shoulders 40, which co-act with corresponding peripherally projecting stroke-limiting abutments 41 of the wedge surfaces in such manner that the latter restrict the axial displacement of the clamping jaws in an upward direction. The limitation of the stroke prevents the anchoring rod being pulled out under unfavourable conditions, as in the case of the rock being too soft or the bore being too large, the clamping jaws being prevented from being moved out beyond the highest position determined by the abutments 41; furthermore, on reaching this limiting position, the clamping jaws 39 are solidly connected with the head section 33. The limitation of the stroke can also be effected by other suitable means such as stops, projections or specially shaped longitudinal grooves.

The height adjustment of the expandible element on the head of the anchoring rod when the clamping jaws are in the untensioned position determines, to a certain extent, the external diameter of the expandible element before it is introduced into the bore in the rock; this setting can be adjusted by suitably screwing the rod stem into or out of the head section 33 whereby the height position of the head section 34 with respect to the head section 33 can be regulated as a result of the co-operation between the stem end 37 and the bearing surface 36 (see Figure 6). If the rod stem is screwed downwardly to such an extent that the end 37 of the stem no longer projects at the top out of the head section 33, then the supporting surface 36 is fitted on the upper end of the head section 33. By this means, the lowermost relative position of the upper head section 34, and so the bearing surface for the expandible element, is determined. If a higher relative position of the bearing surface is desired for obtaining maximum adaptation to the bore hole in the rock, the rod stem is screwed through the head section 33 in the opposite direction to such an extent that a suitable spacing is produced between the two head sections 33 and 34 as shown, for example, in Figure 6, the expandible element assuming the corresponding height position in the unloaded condition.

The adjustability of the bearing surface for the expandible element with respect to the head section comprising the wedge surfaces for the guide means of the clamping jaws can, of course, also be produced by means other than the screw-construction of the rod stem which has been described.

What I claim is:

1. An anchoring device comprising, in combination, elongated rod means having adjacent one end thereof a plurality of outer axially extending surface portions distributed about the axis of said rod means and being inclined to said axis, said surface portions diverging from each other as they approach said end of said rod means; a substantially cup-shaped hood of elastic, yieldable rubber carried by and embracing at least part of said end of said rod means; and a plurality of elongated substantially wedge-shaped clamping jaws and each having opposite ends one of which is relatively thick and the other of which is relatively thin, said thin end of each jaw being located nearer to said end of said rod means than said thick end thereof, said jaws being respectively located next to and extending along said inclined surface portions of said rod means and being suspended at said other ends thereof from said hood, whereby each clamping jaw is movable independently of all other clamping jaws both axially and radially with respect to said rod means, said material urging each jaw toward said end of said rod means after each jaw has moved away from said end of said rod means 2. An anchoring device comprising, in combination, elongated rod means having adjacent one end thereof a plurality of outer axially extending surface portions distributed about the axis of said rod means and being inclined to said axis, said surface portions diverging from each other as they approach said end of said rod means; a substantially cup-shaped hood, composed at least in part of stretchable resilient material, formed with a central opening and carried by and embracing at least part of said end of said rod means; and a plurality of elongated substantially wedge-shaped clamping jaws respectively located next to and extending along said inclined surface portions of said rod means and each having opposite ends one of which is relatively thick and the other of which is relatively thin, said thin end of each jaw being located nearer to said end of said rod means than said thick end thereof, said jaws being yieldably and resiliently suspended at said other ends thereof, from said hood for movement, independently of each other, along said inclined surface portions away from said end of said rod means against the influence of said stretchable, resilient material, whereby each clamping jaw is movable independently of all other clamping jaws both axially and radially with respect to said rod means, said material urging each jaw toward said end of said rod means after each jaw has moved away from said end of said rod means.

3. An anchoring device comprising, in combination, elongated rod means having adjacent one end thereof a plurality of outer axially extending surface portions distributed about the axis of said rod means and being inclined to said axis, said surface portions diverging from each other as they approach said end of said rod means; a substantially cup-shaped hood, composed at least in part of stretchable resilient material, material carried by and embracing at least part of said end of said rod means; a plurality of elongated, substantially wedge-shaped clamping jaws respectively located next to and extending along said inclined surface portions of said rod means and each having opposite ends one of which is relatively thick and the other of which is relatively thin, said thin end of each jaw being located nearer to said end of said rod means than said thick end thereof, said jaws being yieldably and resiliently suspended at said other ends thereof from said hood for movement, independently of each other, along said inclined surface portions away from said end of said rod means against the influence of said stretchable, resilient material, whereby each clamping jaw is movable independently of all other clamping jaws both axially and radially with respect to said rod means, said material urging each jaw toward said end of said rod means after each jaw has moved away from said end of said rod means; and guide strips fixed to the outer surface of said rod means next to said inclined surface portions and extending axially along said rod means for guiding said clamping jaws.

References Cited in the file of this patent

UNITED STATES PATENTS

| Number | Name | Date |
|---|---|---|
| 406,565 | Church | July 9, 1889 |
| 1,110,797 | Knox | Sept. 15, 1914 |
| 1,372,708 | Lovington | Mar. 29, 1921 |
| 2,028,328 | Herold | Jan. 21, 1936 |
| 2,051,251 | Epstein | Aug. 18, 1936 |
| 2,377,077 | Gay et al. | May 29, 1945 |
| 2,570,003 | Palmer | Oct. 2, 1951 |
| 2,667,099 | Lewis | Jan. 26, 1954 |

FOREIGN PATENTS

| Number | Country | Date |
|---|---|---|
| 402,375 | Great Britain | Nov. 30, 1933 |
| 767,444 | France | July 17, 1934 |